Figure 1:
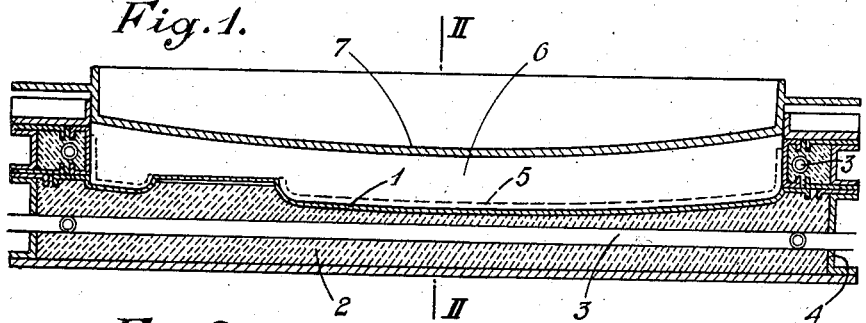

Nov. 26, 1940.   L. ROBIN ET AL   2,222,686
TREATMENT OF SYNTHETIC RESINS AND MATERIALS CONTAINING SAME
Filed March 25, 1937

INVENTORS:
LEO ROBIN AND
MATHIEU VAN ROGGEN
BY Haseltine, Lake & Co.
ATTORNEYS

Patented Nov. 26, 1940

2,222,686

UNITED STATES PATENT OFFICE 2,222,686

TREATMENT OF SYNTHETIC RESINS AND MATERIALS CONTAINING SAME

Leo Robin and Mathieu Van Roggen, Sprimont, Belgium

Application March 25, 1937, Serial No. 133,075
In Belgium April 1, 1936

5 Claims. (Cl. 260—37)

Our invention relates to the treatment of materials containing synthetic or artificial resins, in order to make therefrom moulded articles, such as parts of automobile bodies.

As is well known the hardening of resins is due to polymerisation, with an evolution from a liquid or viscous state A, through a state B in which the partly polymerised resin is solid at ordinary temperature and soluble in a few solvents only, to a final state C in which the resin is in solid, stable and insoluble form. Near state A, the resins are sticky, difficult to be manipulated for moulding purpose and they require prolonged drying. When they are further evolved towards state B, for example in the powder form which is frequently used, they only possess a reduced cohesive power and in order to form homogeneous and strong bodies, they require such high moulding pressure that the power and the cost of the necessary presses become prohibitive when pieces of comparatively large size are to be moulded.

It is the object of our invention to avoid these inconveniences and to this end, in accordance with our invention we use the resinous substances in a colloidal or reticular form, which makes it possible to produce by simple and economical means, with the use of relatively small pressures, moulded bodies which are strong and homogeneous, whatever be their shape and their size. We have found that when resinous substances partly evolved between state A and state B are dispersed in colloidal form in a liquid carrier, they lose their sticky character and acquire a high cohesive power, whereby the moulding pressures and the duration of the heating required for polymerisation may be lessened to a surprising extent.

In carrying out the invention, we use alcohol-soluble synthetic resins partly evolved between state A and state B, and we have found that such resins are caused to assume the colloidal form when mixed with a soap and dissolved in alcohol, the solution then being dispersed in water. The soap is soluble in the resin only through the medium of the alcohol; in presence of water, the soap becomes insoluble in the resin and fractionates same owing to its avidity for water, thus favouring its going over to the colloidal state.

It is also of advantage to add to the mixture a small amount of a heavy solvent, such as furfurol, which also acts as a plastifier.

In order to form a dispersion in water we may use an injection device with a current of water under pressure into which the fluid resinous mixture is introduced, the colloidal matter being collected in a receptacle. Good results are also obtained by gradually pouring the resinous preparation into a receptacle containing water, and suitably stirring the mixture.

For moulding purposes, the colloidal resinous matter is used in admixture with a charge, which is preferably of fibrous nature and consists for example of cotton pulp. This pulp is put into suspension in water by stirring and into this suspension the resinous matter is introduced by injection or pouring. When in the colloidal state the resinous matter amalgamates with the cotton fibres.

The mass formed may be very fluid. In that case we may separate the solid matters by floatation at the surface of the liquid by subjecting the mass to violent stirring and blowing. The separation may be completed by a suction through filtering moulds on which the agglutinated fibres are deposited in a layer which is removed when it reaches a suitable thickness and strength.

It is however usually preferable to start from a less fluid mass and to knead it between mixing rollers revolving at different speeds, in order to obtain directly the material to sheet form. Such sheets, after calendering and drying if necessary, are very similar to leather in appearance, suppleness and toughness. Any small excess of water is easily removed as the mass passes between the mixing rollers. The sheets can easily be moulded under low presure, in heated moulds in which they are softened. We may also, after kneading, roll or form the mass into a block, instead of delivering it in sheet form, and then soften the mass by the action of heat and inject the matter under low pressure into the forming moulds.

With the use of material in sheet form we are enabled to use moulds without a counter die, the latter being replaced by loose material inserted between the sheet lying in the mould and the cover to which the pressure is applied. Thus a material saving is obtained when the moulds are of large size.

Moreover, as the requisite pressures are comparatively low, it is no longer necessary to use moulds made entirely of metal in order to withstand the pressure, and we may use for instance a light metal wall such as a metal sheet shaped to the shape of the piece to be moulded, such metal sheet being supported by a base of reinforced concrete, which makes the mould very cheap. In order to heat the mould, we may use as an armature for the concrete metal tubes connected together in order to permit the circulation of a heating fluid, such as steam.

If the metal wall of the mould is well polished, or chromed, we may obtain directly from the mould finished articles having a smooth and polished surface. We may also carry out in the mould the coloring and varnishing of the moulded pieces by applying within the mould, before placing therein the sheet of resinous matter to be moulded, one or more layers of colored or colorless varnish which, under the action of pressure and heat, will adhere to the sheet and come out of the mould together with the finished article.

Contrary to pieces of Bakelite and like materials which cannot be assembled or mended by welding, the pieces formed of colloidal resinous substance according to our invention are easily welded to each other and mended by applying at an elevated temperature a layer of the same substance between the pieces to be united or on the piece to be mended.

Figure 2:
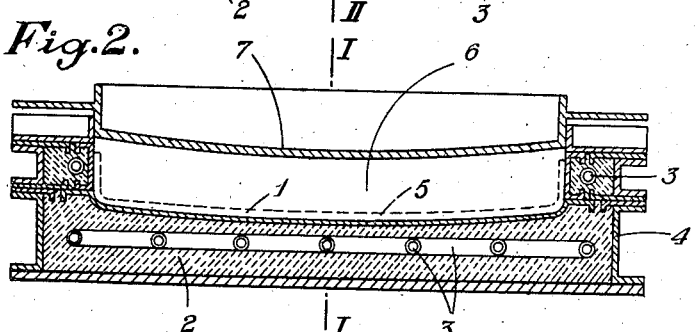

In order that our invention may be more fully understood we shall describe hereafter, by way of example, a manner of carrying it into practice. Referring to the accompanying drawing:

Figs. 1 and 2 respectively show in longitudinal section on line I—I of Fig. 2 and in cross section on line II—II of Fig. 1 a heating and polymerising mould for carrying out our improved process.

Figure 3:
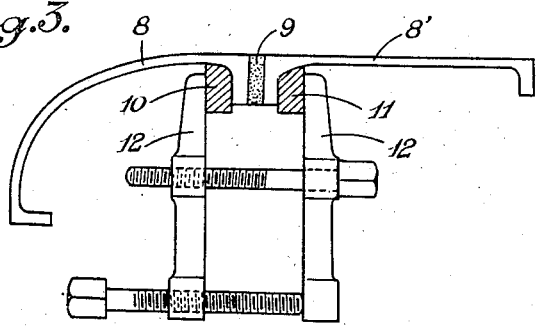
Figure 4:
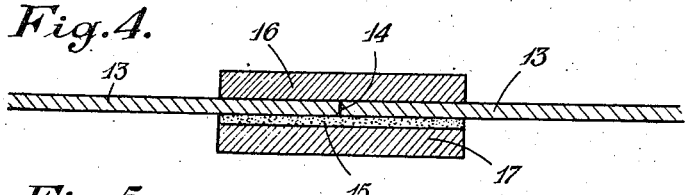
Figure 5:
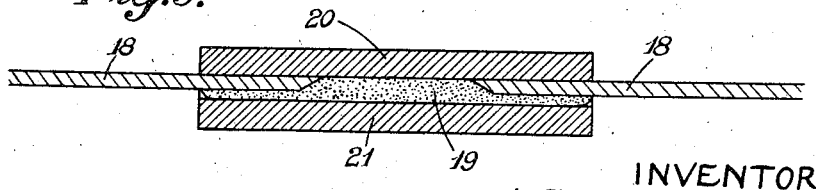

Figs. 3, 4 and 5 illustrate methods of connecting together and mending moulded pieces according to our invention.

In carrying out our invention, we prepare from synthetic or artificial resinous substances, for example phenol-formaldehyde or urea-formaldehyde condensation products, alkyd resins or the like, a colloidal dispersion or a reticular formation in which said substances constitute the solid phase. To that end we use for example a mixture of 32% artificial resin in liquid form or partly evolved between state A and state B, 32% of hard varnish comprising synthetic resin evolved nearly to state B but still soluble in alcohol, 32% alcohol, 3% soap and 1% furfurol. The mixture is effected after the varnish has dissolved in the alcohol. A viscous and very homogeneous liquid is obtained.

On the other hand in a little water we dilute a weight of cotton pulp equal to the weight of resinous mixture, while stirring until a uniform dilution is obtained. We then gradually pour therein the resinous mixture, while stirring the whole mixture.

The alcohol and the soap being water soluble separate from the resin which, on taking the colloidal form, agglutinates with the cotton fibres and forms a thick and tough mass which is then treated in a mixing mill having rollers revolving at different speeds, such as are used in the rubber industry. The paste then is calendered into sheets of suitable thickness, between rolls revolving at the same speed.

After further drying, if necessary, we cut the sheet into two or more sheets which are superposed, and we place into the mould the cut sheet or sheets.

As shown in Figs. 1 and 2, the mould is formed of a steel sheet 1 shaped for example to the shape of the door of a motor car body, and a concrete base 2 cast under the metal sheet 1 so as to support same at all points. The concrete used may comprise Portland cement mixed with metal shavings or cuttings to increase the thermal conductibility and the strength. It is reinforced by iron tubes 3 connected with each other and surrounded by a metal frame 4.

Before receiving the sheet 5 of resinous matter, the mould is heated by circulating steam through the tubes 3. The sheet 5 being placed in position, the remaining cavity 6 in the mould is filled with a loose filler material. The cover 7 then is closed and the whole is subjected in a press to a pressure of 10 to 15 kg. per square centimeter. The cover is bolted or locked to the mould while the pressure is being exerted, and the polymerising heating process then is carried out outside the press by again circulating steam through the tubes 3.

If, as is advantageous from the point of view of ductility and cohesive power, the material forming the sheet still contains a small proportion of the mother liquor from which it was produced, the porosity of the loose filler 6 serving as a counter die favours the elimination of vapors produced during the baking process.

Fig. 3 shows by way of example two pieces 8, 8' of a motor car body, which have thus been moulded and are to be united together. A sheet 9 of calendered resinous matter having been inserted between said pieces, the whole is clamped between heated metal pieces 10, 11 by means of clamping members such as 12 which are removed when the welding is completed.

In Fig. 4 we have shown the mending of a piece 13 broken at 14. At the break we apply a sheet of resinous matter 15 and we heat by means of clamping members 16, 17 to weld the parts together.

Fig. 5 illustrates how a hole in a piece 18 is mended by means of a resinous sheet 19 held by heated metal clamps 20, 21.

It is seen from the above that the invention makes it possible to manufacture, unite and mend moulded pieces of resinous material of all sizes, with greater ease and less expense than heretofore; it is particularly applicable to the mechanical production of motor car bodies in small series, the moulded parts being as strong, lighter and more soundproof than similar parts of sheet metal, and requiring much less expensive apparatus for their manufacture. Our invention, of course is not limited to this application, nor is it limited to the details set forth by way of example, the scope of the invention being defined by the appended claims.

We claim:

1. In a process of treating alcohol-soluble synthetic resins and matrials containing same, dissolving partly polymerised non-solid resinous substances and a soap in alcohol, dispersing the solution in water containing a fibrous suspension thus causing the resinous substances to assume a colloidal form, amalgamating the resinous substances with said fibrous suspension into a paste, and separating the excess liquid from said paste to bring said paste into a moldable condition.

2. In a process of treating alcohol-soluble synthetic resins and materials containing same, dissolving partly polymerised non-solid resinous substances, a heavy solvent and a soap in alcohol, dispersing the solution in water thus causing the resinous substances to assume a colloidal form, mixing the obtained colloidal dispersion with a suspension of cotton fibres in water, amalgamating said resinous substances with said fibres into a paste, and expelling the excess liquid from said paste to bring same into a moldable condition.

3. In a process of treating alcohol-soluble synthetic resins and materials containing same, dissolving partly polymerised non-solid resinous substances together with soap and furfurol in alcohol, dispersing the solution in water thus separating said resinous substances from the water-soluble alcohol, soap and furfurol and causing said resinous substances to assume the colloidal state, amalgamating said colloidal resinous substances with a suspension of fibrous material in water to form a pasty mixture, and expelling liquid from said pasty mixture to bring said pasty mixture into a moldable condition.

4. In a process of treating alcohol-soluble synthetic resins and materials containing same, dissolving partly polymerised non-colloidal resinous substances and a soap in alcohol, preparing a fibrous suspension in water, causing said resinous substances to assume a colloidal form by dispersing said solution in water, and amalgamating said colloidal resinous substances with said fibrous suspension into a moldable paste.

5. In a process of treating synthetic resins and materials containing same, dissolving partly polymerised non-solid resinous substances and a soap in a solvent for said resinous substances, dispersing the solution in water thus causing the resinous substances to assume a colloidal form, mixing the resulting colloidal dispersion with a suspension of fibres in water, amalgamating the colloidal resinous substances with said fibres into a paste, and expelling the excess liquid from said paste to bring same into a moldable condition.

LEO ROBIN.
MATHIEU VAN ROGGEN.